United States Patent
Luo et al.

(10) Patent No.: US 10,528,109 B2
(45) Date of Patent: Jan. 7, 2020

(54) SYSTEM AND METHOD FOR DETERMINING POWER LOADS

(71) Applicant: DELL PRODUCTS, L.P., Round Rock, TX (US)

(72) Inventors: Shiguo Luo, Austin, TX (US); John Erven Jenne, Austin, TX (US); Ralph H. Johnson, III, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 1465 days.

(21) Appl. No.: 14/299,204

(22) Filed: Jun. 9, 2014

(65) Prior Publication Data

US 2015/0355698 A1 Dec. 10, 2015

(51) Int. Cl.
G06F 1/28 (2006.01)
(52) U.S. Cl.
CPC ........................................ *G06F 1/28* (2013.01)
(58) Field of Classification Search
CPC ............ G06F 1/28; G06F 1/26; G01R 21/133
USPC .......................................................... 702/62
See application file for complete search history.

(56) References Cited

U.S. PATENT DOCUMENTS

| | | | | |
|---|---|---|---|---|
| 6,069,521 A | * | 5/2000 | Taylor | H02M 3/07 307/110 |
| 2009/0167282 A1 | * | 7/2009 | Koertzen | H02J 1/102 323/318 |
| 2015/0331049 A1 | * | 11/2015 | Luo | G06F 1/26 324/416 |

* cited by examiner

Primary Examiner — Manuel A Rivera Vargas
Assistant Examiner — Yaritza H Perez Bermudez
(74) Attorney, Agent, or Firm — Isidore PLLC

(57) ABSTRACT

A computer-implemented method enables determining an input power load for a multi voltage rail subsystem in an electronic device such as an information handing system. The method comprises determining a first output power value from a first voltage regulator and a second output power value from a second voltage regulator. A first input power value to the first voltage regulator is determined based at least partially on the first output power value and a second input power value to the second voltage regulator is determined based at least partially on the second output power value. An offset power value is calculated based on the first input power value and the second input power value. A total input power value is calculated based on the offset power value and a third input power value. The total input power value is transmitted to a processor.

25 Claims, 9 Drawing Sheets

VTT and MCP Power Table 322

| CPU Type 410 | VTT Input Power 412 | MCP Input Power 414 |
|---|---|---|
| A | 12 | 6 |
| B | 14 | 9 |
| C | 16 | 12 |
| D | 18 | 15 |
| E | 22 | 18 |
| F | 24 | 21 |

*FIG. 4A*

VTT and MCP Power Efficiency Table 324

| VTT Output Power 420 | VTT Input Power 422 | MCP Output Power 430 | MCP Input Power 432 |
|---|---|---|---|
| 12 | 13 | 5 | 7 |
| 14 | 15 | 6 | 8 |
| 16 | 17 | 7 | 9 |
| 18 | 19 | 8 | 10 |
| 22 | 23 | 9 | 11 |
| 24 | 25 | 10 | 12 |

*FIG. 4B*

SYSTEM AND METHOD FOR DETERMINING POWER LOADS

BACKGROUND

1. Technical Field

The present disclosure generally relates to power control systems and in particular to a system and method for determining power loads for multi voltage rail subsystems of electronic devices.

2. Description of the Related Art

As the value and use of information continue to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are requiring ever increasing amounts of real-time accurate power telemetry data to be used in system level power and thermal management algorithms. Power usage models can include power capping, power reporting, performance per watt tuning and thermal requirements for a given power level. Voltage regulator power monitoring solutions are currently limited to the voltage regulators input or output rail. As power and thermal management algorithms of information handling systems continue to mature, there is a growing need for an aggregate power monitoring solution for all of the input power rails to one or more subsystems of the information handling system. The challenge is to accurately collect power telemetry measurements in a noisy operating condition while minimizing power losses associated with the measurement acquisition technique.

BRIEF SUMMARY

Disclosed is a computer implemented method, a power control system and an information handling system to determine a power load for one or more subsystems of an electronic device, such as a processor or memory of an information handling system, where the one or more subsystems each have multiple voltage rails (i.e., a multi-voltage rail subsystem).

According to one embodiment of the present disclosure, the method comprises determining a first output power value from a first voltage regulator and a second output power value from a second voltage regulator. The method further includes determining a first input power value to the first voltage regulator based at least partially on the first output power value and a second input power value to the second voltage regulator based at least partially on the second output power value. The method then includes calculating an offset power value based on the first input power value and the second input power value and calculating a total input power value based on the offset power value and a third input power value. The total input power value calculated by the method is transmitted to the processor of the information handling system.

According to another embodiment, the power control system of an information handling system comprises a power subsystem configured to be coupled to and supply power to a processor subsystem having multiple voltage rails. The power subsystem includes a first voltage regulator, a second voltage regulator, a third voltage regulator and a board management controller communicatively coupled to the first, second and third voltage regulators. The board management controller has power management firmware executing thereon that configures the board management controller to: determine a first output power value from the first voltage regulator and a second output power value from the second voltage regulator; and to determine a first input power value to the first voltage regulator based at least partially on the first output power value and a second input power value to the second voltage regulator based at least partially on the second output power value. The power management firmware further configures the board management controller to transmit the first input power value and the second input power value from the board management controller to the third voltage regulator. The third voltage regulator calculates an offset power value based on the first input power value and the second input power value. The third voltage regulator calculates a total input power value based on the offset power value and a third input power value. The third voltage regulator transmits the total input power value to the processor.

Also disclosed is an information handling system (IHS) that comprises at least one processor and a power subsystem that is communicatively coupled to the processor and which supplies power to the processor. The power subsystem includes a first voltage regulator, a second voltage regulator, a third voltage regulator and a board management controller that is communicatively coupled to the first, second and third voltage regulators. The board management controller has power management firmware executing thereon that configures the board management controller to: (a) determine a first output power value from the first voltage regulator and a second output power value from the second voltage regulator and (b) determine (i) a first input power value to the first voltage regulator, based at least partially on the first output power value and (ii) a second input power value to the second voltage regulator, based at least partially on the second output power value. The power management firmware further configures the board management controller to transmit the first input power value and the second input power value from the board management controller to the third voltage regulator. The third voltage regulator calculates an offset power value based on the first input power value and the second input power value. The third voltage regulator calculates a total input power value based on the offset power value and a third input power value. The third voltage regulator transmits the total input power value to the processor.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 4A illustrates an input power table for several different processor types stored within the board management controller, in accordance with one embodiment;

FIG. 4B illustrates a power efficiency table stored within the board management controller, in accordance with one embodiment;

DETAILED DESCRIPTION

Figure 1:
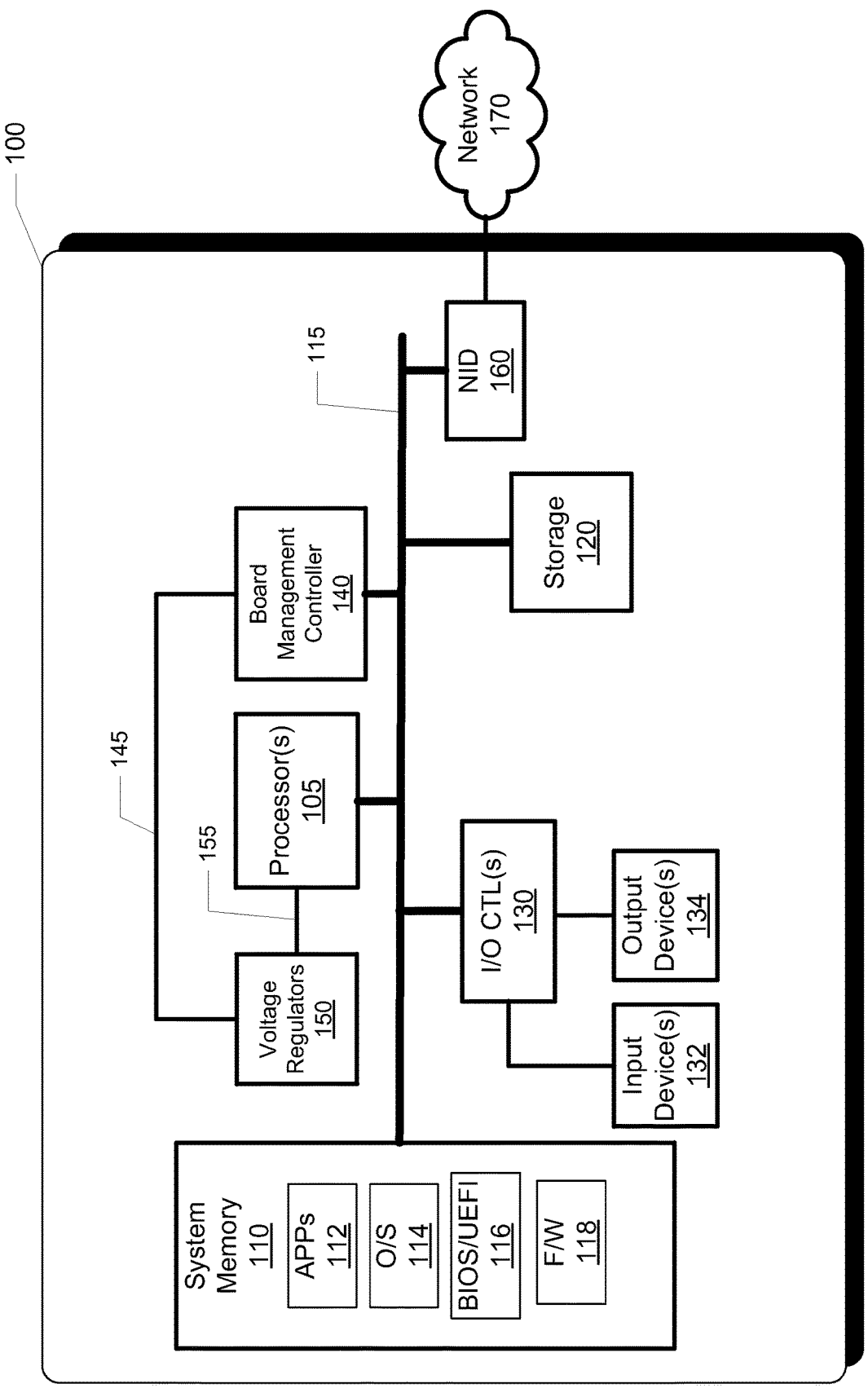
FIG. 1 illustrates an example information handling system within which various aspects of the disclosure can be implemented, according to one or more embodiments.

The illustrative embodiments provide a computer implemented method, a power control system and an information handling system to determine a power load for one or more subsystems of an electronic device, such as a processor or memory of an information handling system, where the one or more subsystems each have multiple voltage rails (i.e., a multi voltage rail subsystem).

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, example IHS 100 includes one or more processor(s) 105 coupled to system memory 110 via system interconnect 115. System interconnect 115 can be interchangeably referred to as a system bus, in one or more embodiments. Also coupled to system interconnect 115 is storage 120 within which can be stored one or more software and/or firmware modules and/or data (not specifically shown). In one embodiment, storage 120 can be a hard drive or a solid state drive. The one or more software and/or firmware modules within storage 120 can be loaded into system memory 110 during operation of IHS 100. As shown, system memory 110 can include therein a plurality of software and/or firmware modules including application(s) 112, operating system (O/S) 114, basic input/output system (BIOS) 116 and firmware (F/W) 118.

In one or more embodiments, BIOS 116 comprises additional functionality associated with unified extensible firmware interface (UEFI), and can be more completely referred to as BIOS/UEFI in these embodiments. The various software and/or firmware modules have varying functionality when their corresponding program code is executed by processor(s) 105 or other processing devices within IHS 100.

IHS 100 further includes one or more input/output (I/O) controllers 130 which support connection by, and processing of signals from, one or more connected input device(s) 132, such as a keyboard, mouse, touch screen, or microphone. I/O controllers 130 also support connection to and forwarding of output signals to one or more connected output devices 134, such as a monitor or display device or audio speaker(s) or light emitting diodes (LEDs).

Additionally, in one or more embodiments, IHS 100 includes a board management controller (BMC) 140 that is coupled to system interconnect 115. BMC 140 contains components that at least partially enable an input power load to be determined for processor(s) 105. IHS 100 further includes several voltage regulators, collectively referred to as voltage regulators 150, which supply one or more voltage and current levels to processor(s) 105. Voltage regulators 150 are communicatively coupled to BMC 140 via a digital communication connection 145 such as an I2C bus or a power management (PM) bus. Voltage regulators 150 are connected to processor(s) 105 via data and power connection 155. Voltage regulators 150 also contain components that at least partially enable an input power load to be determined for processor(s) 105.

IHS 100 further comprises a network interface device (NID) 160. NID 160 enables IHS 100 to communicate and/or interface with other devices, services, and components that are located external to IHS 100. These devices, services, and components can interface with IHS 100 via an external network, such as example network 170, using one or more communication protocols. Network 170 can be a local area network, wide area network, personal area network, and the like, and the connection to and/or between network 170 and IHS 100 can be wired or wireless or a combination thereof. For purposes of discussion, network 170 is indicated as a single collective component for simplicity. However, it is appreciated that network 170 can comprise one or more direct connections to other devices as well as a more complex set of interconnections as can exist within a wide area network, such as the Internet.

Figure 2:
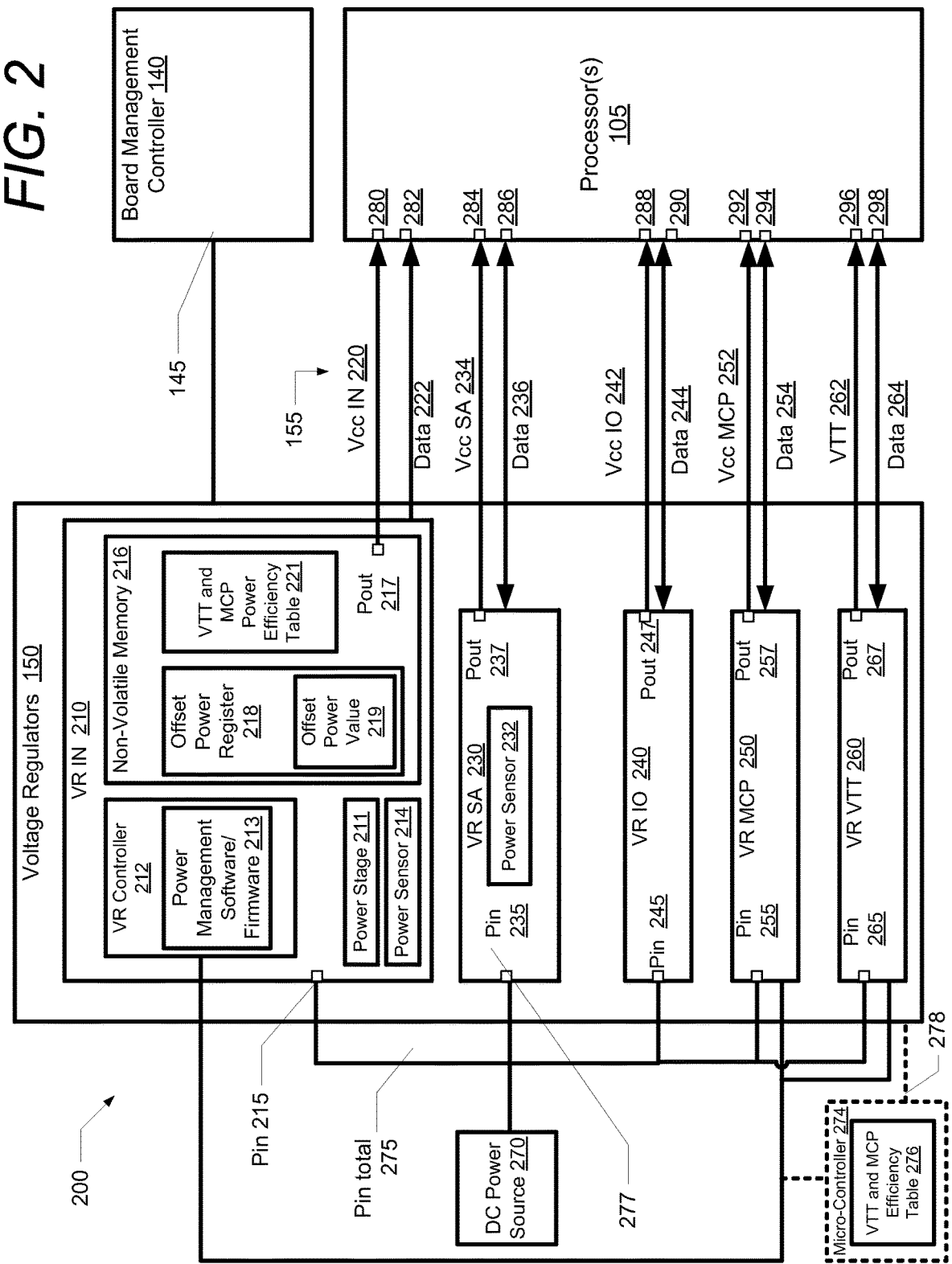
FIG. 2 illustrates a component level view of a power sub-system including voltage regulators, a board management controller and other functional components that support determining a power load, in accordance with one embodiment.

With reference now to FIG. 2, there is shown an exemplary power subsystem 200 that implements a process of determining a power load. In the discussion of FIG. 2 and the following figures, the description of each figure can include general reference to the specific components illustrated within the preceding figure. Power subsystem 200 comprises BMC 140, voltage regulators 150, DC power source 270 and micro-controller 274. BMC 140 is coupled to voltage regulators 150 via a digital communication connection 145 such as an I2C bus or a PMbus. BMC 140 can transmit and receive data from voltage regulators 150 via digital communication connection 145.

Voltage regulators 150 include several different voltage regulators that provide power to processor 105 at several different voltages, currents and power levels. Voltage regulators 150 comprise voltage regulators (VR) VR IN 210, VR SA 230, VR IO 240, VR MCP 250 and VR VTT 260. VR IN 210 provides the main processor input voltage VccIN or main voltage rail to processor 105 via input power line VccIN 220 that is connected to processor input power terminal 280. VR IN 210 receives an input power level or value Pin 215 and produces an output power level or value Pout 217. The VccIN input power is the primary power source for the central processing units (CPUs) of processor 105. VR IN 210 communicates with processor 105 via data circuit line 222 that is connected to processor data terminal 282.

VR SA 230 provides a system agent (SA) voltage, VccSA, to processor 105 via VccSA input power line 234 that is connected to processor input power terminal 284. The VccSA voltage supplies power to PCI controllers and memory controllers within processor 105. VR SA 230 receives an input power level or value Pin 235 and produces an output power level or value Pout 237. VR SA 230 communicates with processor 105 via data circuit line 236 that is connected to processor data terminal 286. VR SA 230 further includes a power sensor 232 for measuring the input power, Pin 235, drawn by VR SA 230. In one alternate embodiment, the process utilizes output power and efficiency number to estimate the input power and power sensor 232 is not provided within VR SA 230. This implementation also applies when estimating input power for the VR IN regulator.

VR IO 240 provides an input output (IO) voltage, VccIO, to processor 105 via input power line Vcc IO 242, which is connected to processor input power terminal 288. The VccIO voltage supplies power to input/output pins of processor 105. VR IO 240 receives an input power level or value, Pin 245, and produces an output power level or value, Pout 247. VR IO 240 communicates with processor 105 via data circuit line 244, which is connected to processor data terminal 290.

VR MCP 250 provides a math co-processor (MCP) voltage to processor 105 via input power line Vcc MCP 252, which is connected to processor input power terminal 292. The Vcc MCP voltage supplies power to a math co-processor within processor 105. VR MCP 250 receives an input power level or value, Pin 255, and produces an output power level or value, Pout 257. VR MCP 250 communicates with processor 105 via data circuit line 254, which is connected to processor data terminal 294.

VR VTT 260 provides a VTT voltage to processor 105 via input power line VTT 262 connected to processor input power terminal 296. The VTT voltage supplies power to an integrated memory controller and cache memory within processor 105. VR VTT 260 receives an input power level or value, Pin 265, and produces an output power level or value, Pout 267. VR VTT 260 communicates with processor 105 via data circuit line 264 connected to processor data terminal 298.

As one exemplary embodiment, VR IN 210 can include a power stage 211 and a voltage regulator (VR) controller 212 that can control one or more functions of voltage regulators 150. Voltage regulator controller 212 can control the output of power stage 211 and/or selectively enable and disable voltage regulator phases supplied by power subsystem 200. In one embodiment, VR controller 212 comprises power management software/firmware 213 that enables the determination of a power load for processor(s) 105. In another embodiment, VR controller 212 comprises power management software/firmware 213 that enables the determination of a power load for power subsystem 200. VR IN 210 further includes a power sensor 214 for measuring the input power Pin 215 drawn by VR IN 210. Non-volatile memory 216 contains an offset power register 218 and a VTT and MCP efficiency table 221 that maps input power values Pin 255 and Pin 265 corresponding to output power values Pout 257 and Pout 267. Offset power register 218 contains an offset power value 219. In one embodiment, VR controller 212 is in direct communication with VR MCP 250 and VR VTT 260 via a digital communication connection 277 such as an I2C bus or a PMbus.

A DC power source 270 is connected to VR IN 210, VR SA 230, VR IO 240, VR MCP 250 and VR VTT 260. DC power source 270 supplies a total input power value 275 to voltage regulators 150. Total input power value 275 is the sum of input power values Pin 215, Pin 235, Pin 245, Pin 255 and Pin 265.

In one embodiment, power subsystem 200 can include a micro-controller 274. Micro-controller 274 is in communication with VR controller 212 via a digital communication connection 277 such as an I2C bus or PMBus. Micro-controller 274 is also in communication with VR MCP 250 and VR VTT 260 via digital communication connections 278 such as an I2C bus or a PMBus. Micro-controller 274 can receive output power values Pout 257 and Pout 267 from VR MCP 250 and VR VTT 260 over digital communication connections 278. Micro-controller 274 can store a VTT and MCP efficiency table 276 that maps input power values Pin 255 and Pin 265 corresponding to output power values Pout 257 and Pout 267.

Figure 3:
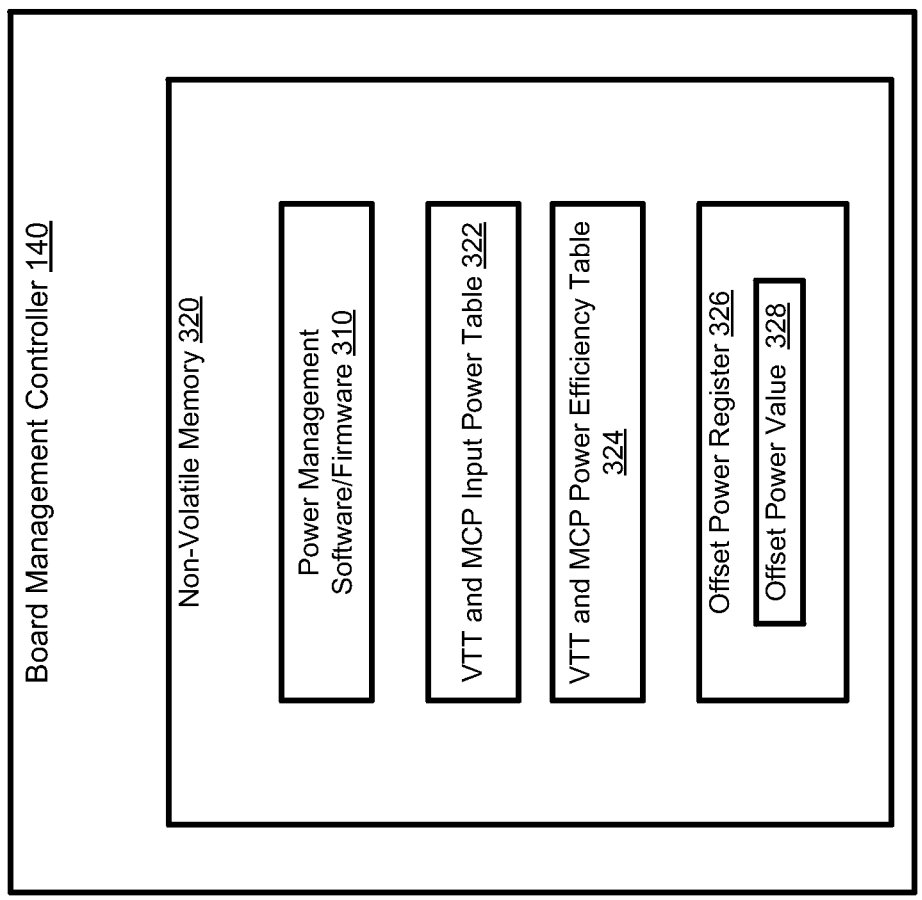
FIG. 3 illustrates further details of the board management controller, in accordance with one embodiment.

FIG. 3 illustrates details of BMC 140. BMC 140 and VR controller 212 enable a total input power load Pin total 275 to be determined for processor(s) 105 based at least partially on output power values Pout 257 and Pout 267. BMC 140 includes an internal non-volatile memory 320. Memory 320 can be a persistent storage device such as flash memory that retains data without power. In at least one embodiment, memory 320 can store (i) power management software/firmware 310 that at least partially enables the determination of a power load for processor(s) 105 and (ii) a VTT and MCP input power table 322 that maps input power values Pin 255 and Pin 265 corresponding to an identified type of processor 105. Memory 320 can further store a VTT and MCP efficiency table 324 that maps input power values Pin 255 and Pin 265 corresponding to output power values Pout 257 and Pout 267. Memory 320 also includes an offset power register 326. Offset power register 326 contains the sum of Pin 255 and Pin 265. The contents of offset power register 326 are transmitted from BMC 140 via digital communication connection 145 to VR IN 210, where the contents are stored to offset power register 218 (FIG. 2). VR controller 212 uses the contents of offset power register 218 to calculate total input power 275.

FIG. 4A illustrates further details of VTT and MCP input power table 322. VTT and MCP input power table 322 includes a processor type column 410 that identifies a type of processor 105. Processor 105 can be characterized during manufacturing according to product binning which is the categorizing of the processor based on thermal, frequency and power characteristics. VTT input power column 412 contains Pin 265 input power values that correspond to the identified type of processor 105. MCP input power column 414 contains Pin 255 input power values that correspond to the identified type of processor 105.

FIG. 4B illustrates further details of VTT and MCP power efficiency table 324. VTT and MCP power efficiency table 324 includes a VTT output power column 420 and a corresponding VTT input power column 422. The VTT input power column 422 provides the input power values Pin 265 drawn by VR VTT 260 at each corresponding output power level Pout 267 of VR VTT 260. The values contained in input power column 422 are based on the operating efficiency of VR VTT 260 (i.e., how much power is lost by the operation of VR VTT 260). VTT and MCP power efficiency table 324 further includes a MCP output power column 430 and a corresponding MCP input power column 432. The MCP input power column 432 provides the input power values Pin 255 drawn by VR MCP 250 at each corresponding output power level Pout 257 of VR MCP 250. The values contained in input power column 432 are based on the operating efficiency of VR MCP 250 (i.e., how much power is lost by the operation of VR MCP 250).

During operation of the information handling system 100, power management software/firmware 310 runs or executes on BMC 140. Power management software/firmware 310 (executing on BMC 140) functions to determine the output power values Pout 257 and Pout 267. BMC 140 determines the input power value Pin 255 to voltage regulator VR MCP 250 based at least partially on Pout 257. BMC 140 determines the input power value Pin 265 to voltage regulator VR VTT 260 based at least partially on Pout 267. BMC 140 transmits the input power values Pin 255 and Pin 265 to VR controller 212. During operation of the information handling system 100, power management software/firmware 213 runs or executes on VR controller 212. VR controller 212 calculates a total input power value Pin total 275 based on the offset power value 219 received from BMC 140 and the input power value Pin 215 to VR IN 210. VR controller 212 transmits the total input power value Pin total 275 to processor 105. Processor 105 uses the total input power value Pin total 275 in order to determine if processor 105 can support operation at higher frequencies (turbo states) or at higher processing speeds.

Those of ordinary skill in the art will appreciate that the hardware components and basic configuration depicted in FIGS. 1-4B and described herein may vary. For example, the illustrative components within IHS 100 (FIG. 1) and power subsystem 200 (FIG. 2) are not intended to be exhaustive, but rather are representative to highlight components that can be utilized to implement aspects of the present disclosure. For example, other devices/components may be used in addition to or in place of the hardware depicted. The depicted example does not convey or imply any architectural or other limitations with respect to the presently described embodiments and/or the general disclosure.

The following flowcharts of FIGS. 5-9 disclose specific functionality provided by BMC 140 and VR controller 212. Specifically, the following charts provide various methods implemented by the execution of power management software/firmware 310 on BMC 140 and the execution of power management software/firmware 213 on VR controller 212 to enable the determining of an input power load to processor 105. According to one or more embodiments, power management software/firmware 310 executing on BMC 140 and power management software/firmware 213 executing on VR controller 212 both include program code that when executed respectively configures the BMC 140 and VR controller 212 to provide the various functions described within the present disclosure.

FIGS. 5-9 illustrate flowcharts of exemplary methods by which BMC 140, VR controller 212 and micro-controller 274 within the preceding figures perform different aspects of the processes that enable the one or more embodiments of the disclosure. Generally, methods 500, 600, 700, 800 and 900, collectively, represent computer-implemented methods to enable determining an input power load to processor 105. The description of each method is provided with general reference to the specific components illustrated within the preceding FIGS. 1-4B. Generally, each method is described as being implemented via power subsystem 200 and particularly the execution of code provided by power management software/firmware 310 within BMC 140 and power management software/firmware 213 within VR controller 212. It is however appreciated that certain aspects of the described methods may be implemented via other processing devices and/or execution of other code.

Figure 5:
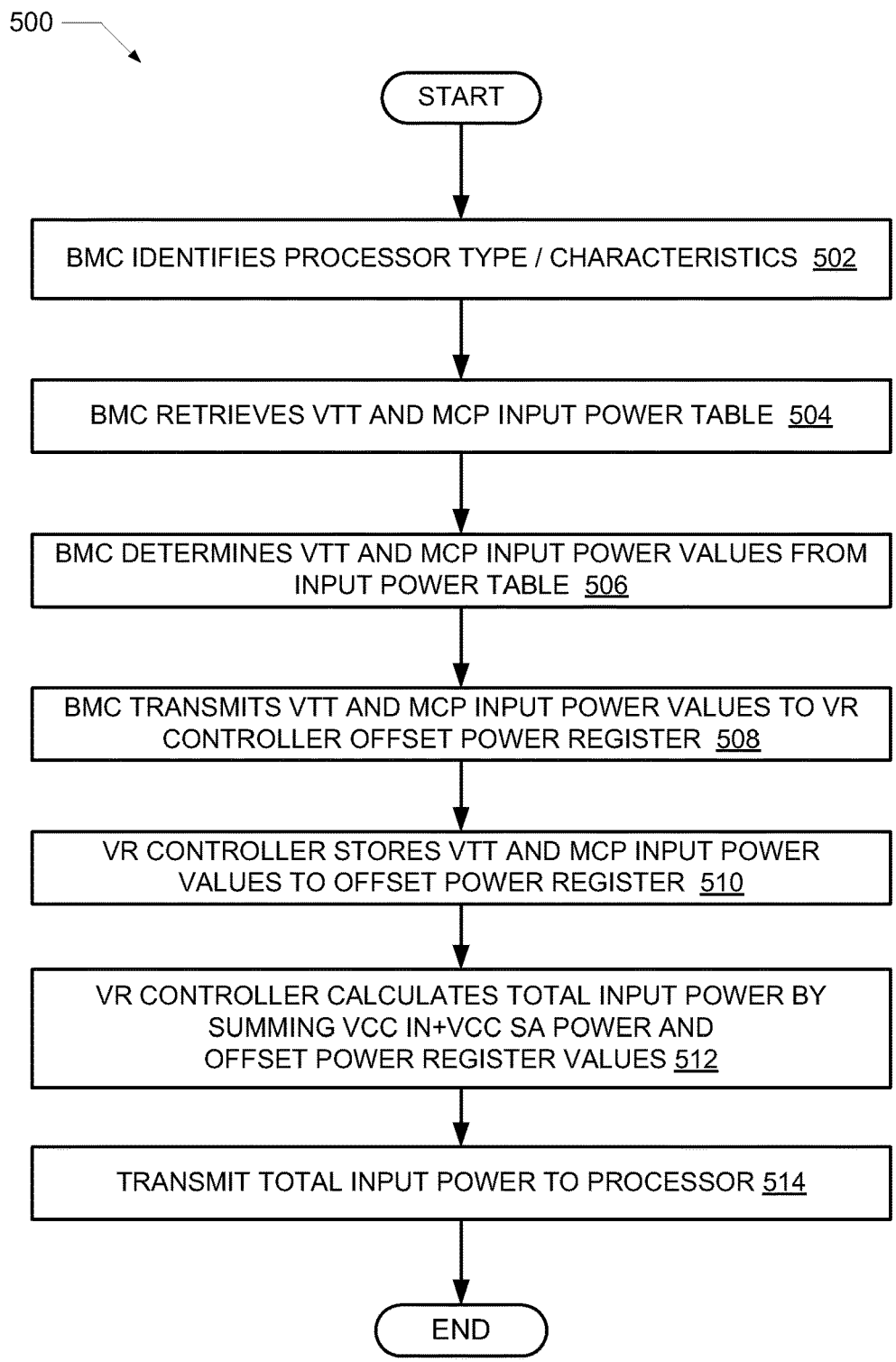
FIG. 5 is a flow chart illustrating one example of the method by which a power load is determined for a processor using a processor type table, according to one or more embodiments.

Turning to FIG. 5, method 500 illustrates a process for determining a total input power to processor 105. Method 500 begins at the start block and proceeds to block 502 where BMC 140 identifies the type of processor 105. In one embodiment, BMC 140 communicates with processor 105 via system interconnect 115 to determine the processor type. In one embodiment, BMC 140 polls processor 105 to determine the processor type. At block 504, BMC 140 retrieves VTT and MCP input power table 322 from memory 320. BMC 140 determines the input power value Pin 255 to voltage regulator VR MCP 250 and the input power value Pin 265 to voltage regulator VR VTT 260 from the VTT and MCP input power table 322 and the identified processor type (block 506). In other words, BMC 140 reads the corresponding Pin 255 and Pin 265 from input power table 322. BMC 140 transmits the input power values Pin 255 and Pin 265 to VR controller 212 (block 508). VR controller 212 stores the input power values Pin 255 and Pin 265 to offset power register 218 (block 510). VR controller 212 calculates a total input power value Pin total 275 based on the sum of the offset power value 219 (sum of Pin 255 and Pin 265) and the input power value Pin 215 and Pin 235 (block 512). VR controller 212 transmits the total input power value Pin total 275 to processor 105 at block 514. Method 500 then terminates.

Figure 6:
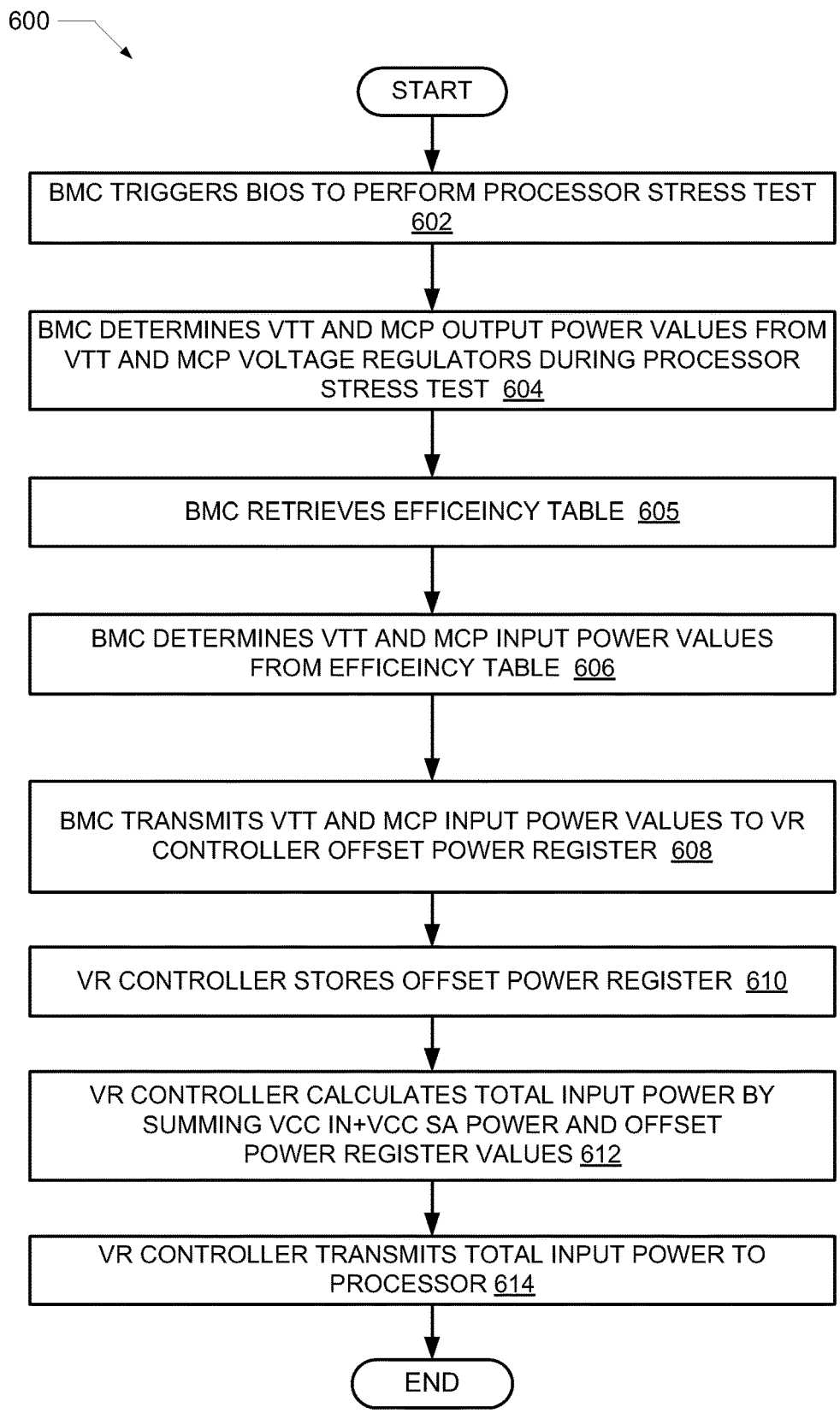
FIG. 6 is a flow chart illustrating one example of the method by which a power load is determined for a processor using a processor stress test and a power efficiency table, according to one or more embodiments.

Referring to FIG. 6, method 600 illustrates another process for determining a total input power to processor 105. Method 600 begins at the start block and proceeds to block 602 where BMC 140 triggers BIOS 116 to perform a stress test on processor 105. During the stress test, processor 105 is operated near a maximum power level. At block 604, BMC 140 determines the respective VTT and MCP output power values Pout 257 and Pout 267 during the processor stress test. BMC 140 retrieves VTT and MCP power efficiency table 324 from memory 320 (block 605). BMC 140 determines the input power values Pin 255 and Pin 265 from VTT and MCP power efficiency table 324 (block 606). BMC 140 transmits the input power values Pin 255 and Pin 265 to VR controller 212 (block 608). VR controller 212 stores the input power values Pin 255 and Pin 265 to offset power register 218 (block 610). VR controller 212 calculates a total input power value Pin total 275 based on the sum of the offset power value 219 (sum of Pin 255 and Pin 265) and the input power value Pin 215 and Pin 235 (block 612). VR controller 212 transmits the total input power value Pin total 275 to processor 105 at block 614. Method 600 then ends.

Figure 7:
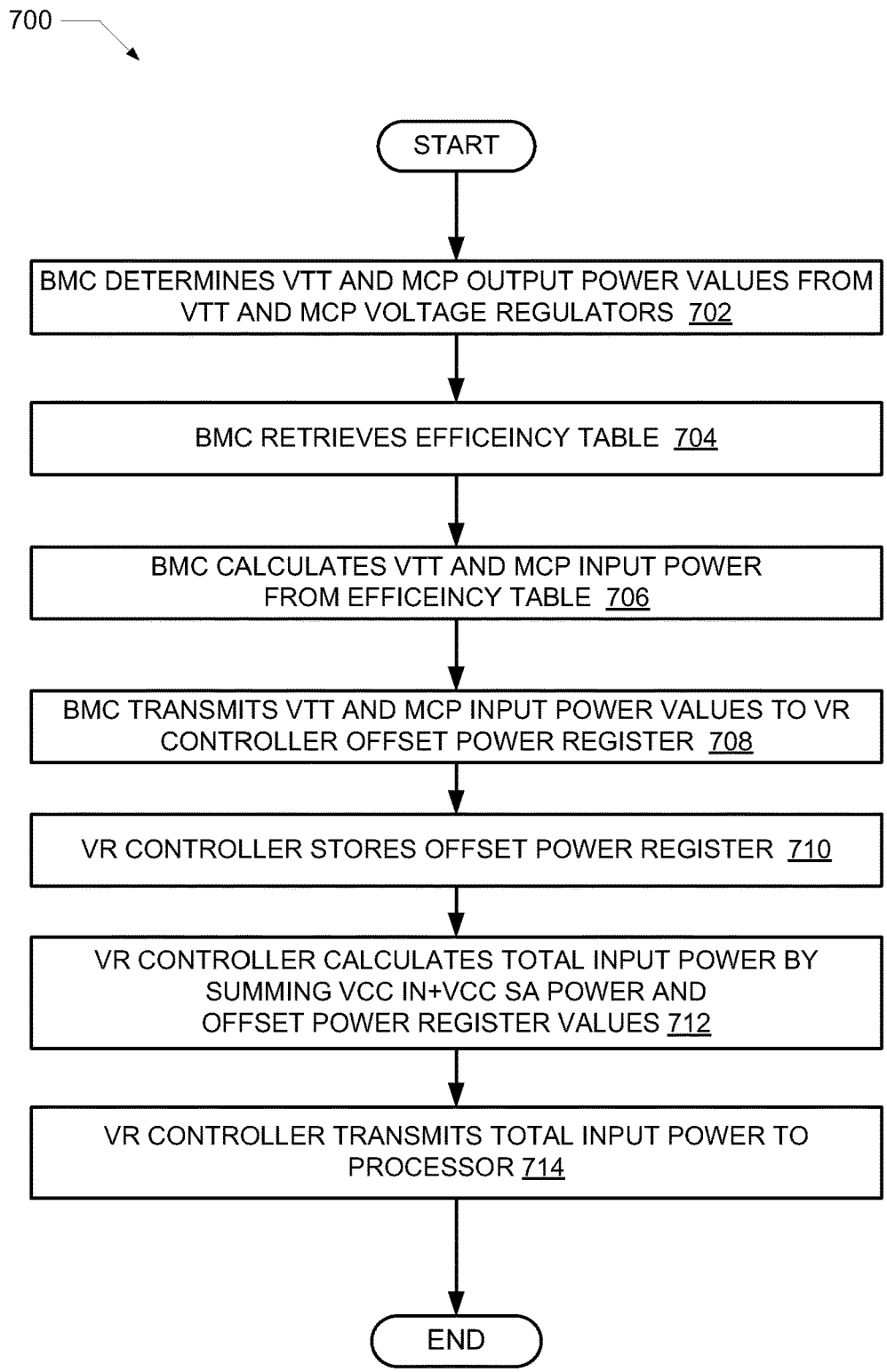
FIG. 7 is a flow chart illustrating one example of the method by which a power load is determined for a processor using a board management controller and a power efficiency table, according to one or more embodiments.

With reference to FIG. 7, method 700 illustrates an additional process for determining a total input power to processor 105. Method 700 begins at the start block and proceeds to block 702 where BMC 140 determines the VTT and MCP output power values Pout 257 and Pout 267. BMC 140 determines the VTT and MCP output power values Pout 257 and Pout 267 through direct communication with VR MCP 250 and VR VTT 260 via digital communication connection 145. In one embodiment, BMC 140 periodically polls VR MCP 250 and VR VTT 260 for the VTT and MCP output power values Pout 257 and Pout 267. BMC 140 retrieves power efficiency table 324 from memory 320 (block 704). BMC 140 determines the input power values Pin 255 and Pin 265 from power efficiency table 324 (block 706). BMC 140 transmits the input power values Pin 255 and Pin 265 to VR controller 212 (block 708). VR controller 212 stores the input power values Pin 255 and Pin 265 to offset power register 218 (block 710). VR controller 212 calculates a total input power value Pin total 275 based on the sum of the offset power value 219 (sum of Pin 255 and Pin 265) and the input power value Pin 215 and Pin 235 (block 712). VR controller 212 transmits the total input power value Pin total 275 to processor 105 at block 714. Method 700 then ends.

Figure 8:
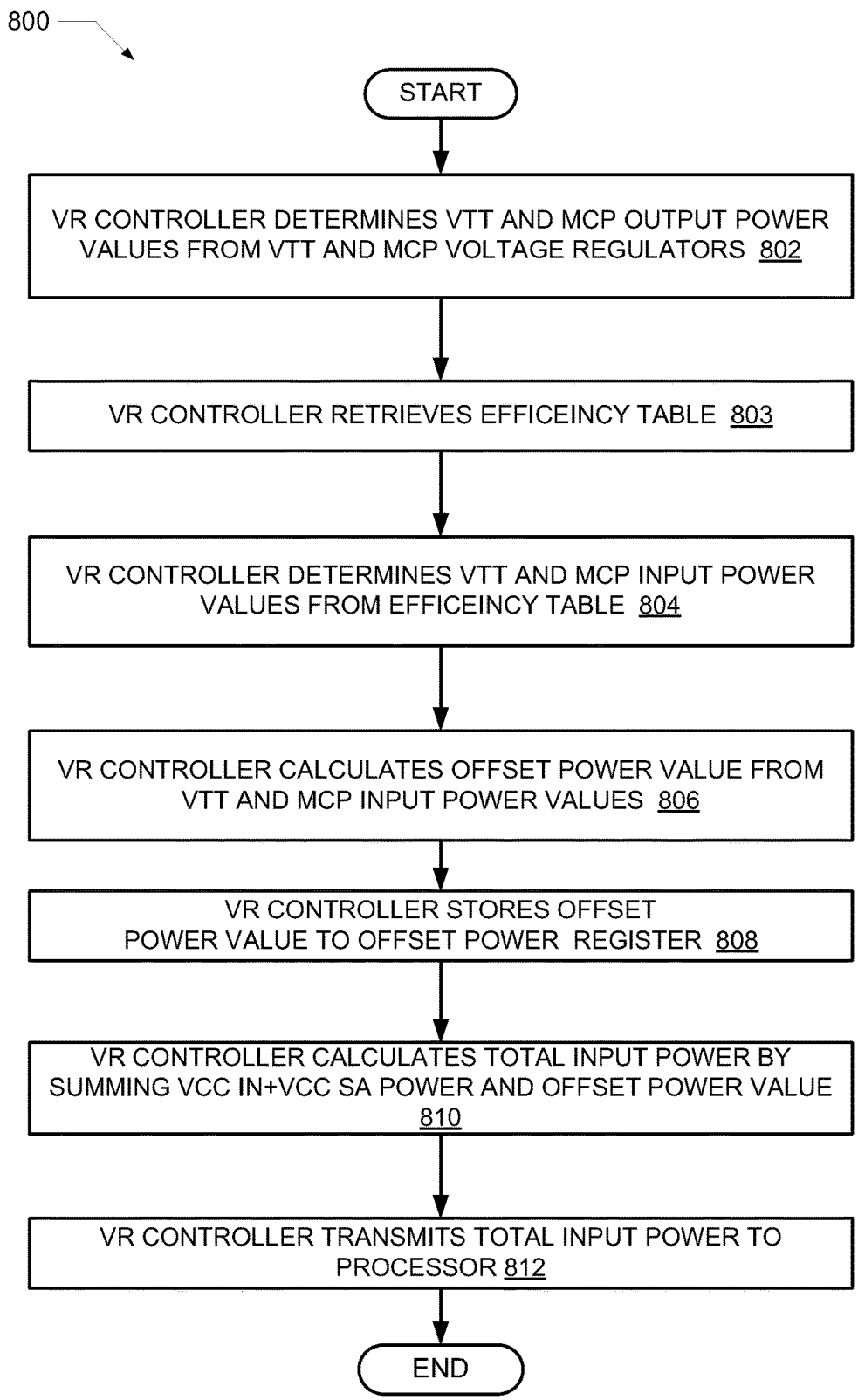
FIG. 8 is a flow chart illustrating one example of the method by which a power load is determined for a processor using a voltage regulator controller and a power efficiency table, according to one or more embodiments.

FIG. 8, shows a method 800 that illustrates yet another process for determining a total input power to processor 105. Method 800 begins at the start block and proceeds to block 802 where VR controller 212 determines the VTT and MCP output power values Pout 257 and Pout 267. In one embodiment, VR controller 212 periodically polls the VTT and MCP output power values Pout 257 and Pout 267 through direct communication with VR MCP 250 and VR VTT 260 via digital communication connection 277. VR controller 212 retrieves VTT and MCP power efficiency table 221 from memory 216 (block 803). VR controller 212 determines the input power values Pin 255 and Pin 265 from power efficiency table 324 (block 804). VR controller 212 calculates an offset power value 219 by summing Pin 255 and Pin 265 (block 806). VR controller 212 stores the offset power value 219 to offset power register 218 (block 808). VR controller 212 calculates a total input power value Pin total 275 based on the sum of the offset power value 219 and the input power value Pin 215 and Pin 235 (block 810). VR controller 212 transmits the total input power value Pin total 275 to processor 105 at block 812. Method 800 then terminates.

Figure 9:
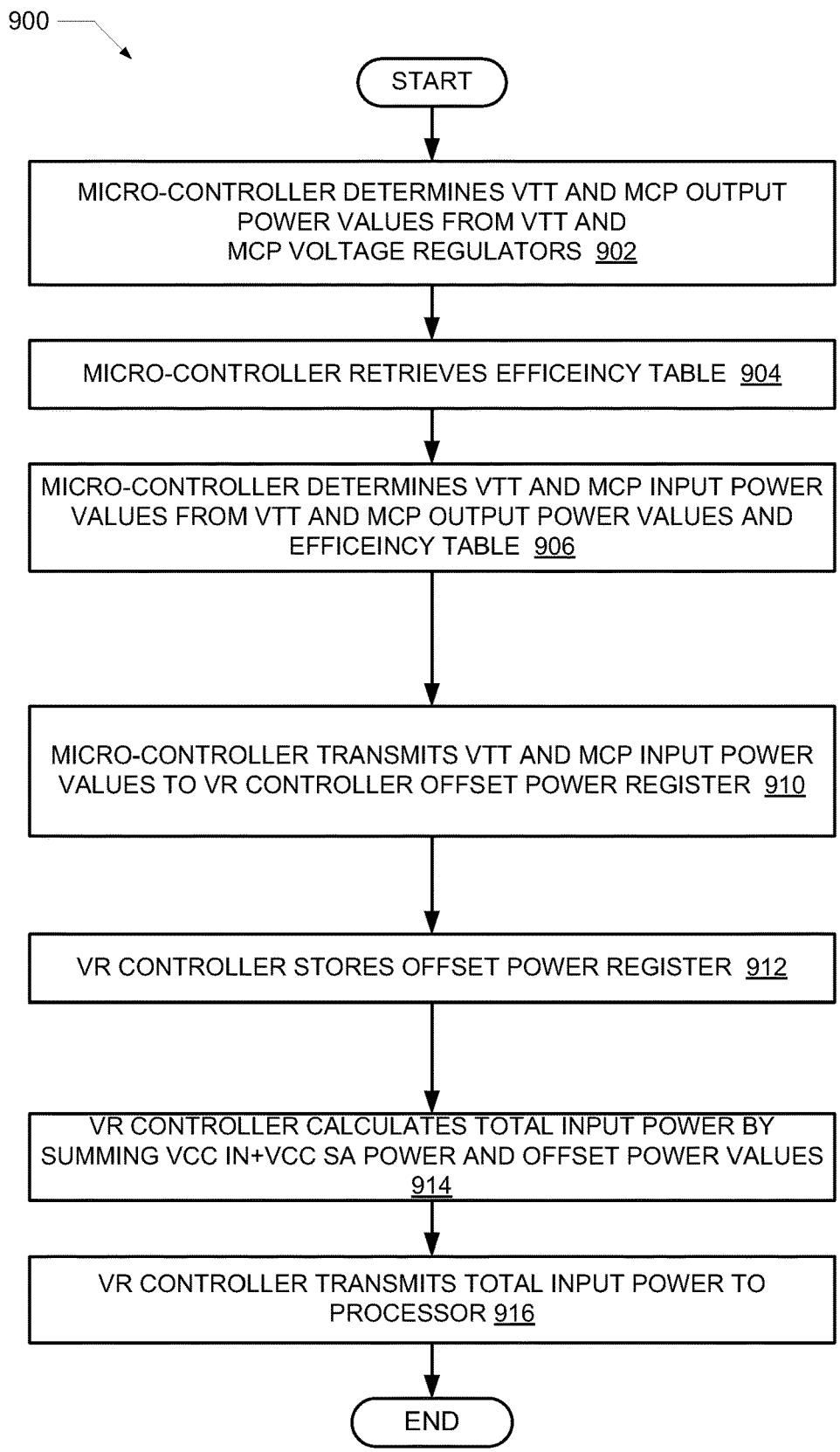
FIG. 9 is a flow chart illustrating one example of the method by which a power load is determined for a processor using a micro-controller and a power efficiency table, according to one or more embodiments.

FIG. 9 illustrates one more method 900 for determining a total input power to processor 105. Method 900 begins at the start block and proceeds to block 902 where micro-controller 274 determines the VTT and MCP output power values Pout 257 and Pout 267. In one embodiment, micro-controller 274 periodically polls the VTT and MCP output power values Pout 257 and Pout 267 through direct communication with VR MCP 250 and VR VTT 260 via digital communication connection 278. Micro-controller 274 retrieves power efficiency table 276 (block 904). Micro-controller 274 determines the input power values Pin 255 and Pin 265 from VTT and MCP power efficiency table 276 (block 906). Micro-controller 274 transmits the input power values Pin 255 and Pin 265 values to VR controller 212 (block 910) and stores the input power values to offset power register 218 (block 912). VR controller 212 calculates a total input power value Pin total 275 based on the sum of the offset power value 219 (sum of Pin 255 and Pin 265) and the input power value Pin 215 and Pin 235 (block 914). VR controller 212 transmits the total input power value Pin total 275 to processor 105 at block 916. Method 900 then ends.

In the above described flow charts, one or more of the methods may be embodied in a computer readable medium containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

As will be further appreciated, the processes in embodiments of the present disclosure may be implemented using any combination of software, firmware or hardware. Accordingly, aspects of the present disclosure may take the form of an entire hardware embodiment or an embodiment combining software (including firmware, resident software, microcode, etc.) and hardware aspects that may all generally be referred to herein as a "circuit," "module," or "system."

Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A computer implemented method of determining a power load for at least one subsystem in an electronic device such as an information handling system, the method comprising:

retrieving a first output power value from a first voltage regulator (VR) and a second output power value from a second voltage regulator;

determining, by one of a VR controller and a board management module (BMC), both (i) a first input power value to the first voltage regulator based at least partially on the first output power value and (ii) a second input power value to the second voltage regulator based at least partially on the second output power value, wherein the determining includes referencing one of an input power table associated with an identified processor type and a power efficiency table;

calculating, by the VR controller, an offset power value based on the first input power value and the second input power value;

calculating, by the VR controller, a total input power value based on the offset power value and a third input power value to a third voltage regulator; and transmitting, by the VR controller, the total input power value to a processor of the electronic device, wherein the processor utilizes the total input power value to determine if the processor can support operation at higher frequencies, including at turbo states, or at higher processing speeds.

2. The method of claim 1, further comprising:
identifying, via a board management controller, a processor type;
retrieving an input power table associated with the identified processor type;
completing the determining of the first input power value based from the first output power value by utilizing the input power table;
completing the determining of the second input power value from the second output power value by utilizing the input power table;
transmitting the first input power value and the second input power value from the board management controller to a third voltage regulator; and
storing the first input power value and the second input power value to an offset register of the third voltage regulator.

3. The method of claim 1, further comprising:
triggering, via a board management controller, a processor stress test;
determining, via the board management controller, the first output power value and the second output power value during the processor stress test;
retrieving a power efficiency table;
completing the determining of the first input power value from the first output power value by utilizing the power efficiency table;
completing the determining of the second input power value from the second output power value by utilizing the power efficiency table;
transmitting the first input power value and the second input power value from the board management controller to a third voltage regulator; and
storing the first input power value and the second input power value to an offset register of the third voltage regulator.

4. The method of claim 1, further comprising:
determining, via a board management controller, the first output power value and the second output power value during operation of the processor;
retrieving a power efficiency table;
completing the determining of the first input power value from the first output power value by utilizing the power efficiency table;
completing the determining of the second input power value from the second output power value by utilizing the power efficiency table;
transmitting the first input power value and the second input power value from the board management controller to a third voltage regulator; and
storing the first input power value and the second input power value to an offset register of the third voltage regulator.

5. The method of claim 1, wherein determining the first output power value from the first voltage regulator and the second output power value from the second voltage regulator is based at least partially on a third voltage regulator polling the first voltage regulator for the first output power value and the second voltage regulator for the second output power.

6. The method of claim 5, further comprising:
retrieving, via the third voltage regulator, a power efficiency table;
completing the determining, via the third voltage regulator, of the first input power value from the first output power value by utilizing the power efficiency table;
completing the determining, via the third voltage regulator, of the second input power value from the second output power value by utilizing the power efficiency table;
calculating, via the third voltage regulator, the offset power value based on the first input power value and the second input power value; and
calculating, via the third voltage regulator, the total input power value based on the offset power value and the third input power value.

7. The method of claim 1, wherein determining the first output power value from the first voltage regulator and the second output power value from the second voltage regulator comprises a micro-controller retrieving the first output power value from the first voltage regulator and the second output power value from the second voltage regulator.

8. The method of claim 7, further comprising:
retrieving, via the micro-controller, a power efficiency table;
completing the determining, via the micro-controller, of the first input power value from the first output power value by utilizing the power efficiency table;
completing the determining, via the micro-controller, of the second input power value from the second output power value by utilizing the power efficiency table; and
transmitting the first input power value and the second input power value from the micro-controller to a third voltage regulator.

9. The method of claim 1, wherein the first input power value is associated with power delivered to a memory controller power terminal of the processor, the second input power value is associated with power delivered to a math coprocessor power terminal of the processor and the third input power value is associated with power delivered to a primary input power terminal of the processor.

10. A power control system comprising:
a power subsystem configured to be coupled to and supply power to a processor, the power subsystem including a first voltage regulator, a second voltage regulator, a third voltage regulator and a board management controller communicatively coupled to the first, second and third voltage regulators, the board management controller having power management firmware executing thereon that configures the board management controller (BMC) to:

retrieve a first output power value from a first voltage regulator (VR) and a second output power value from a second voltage regulator;

determine both (i) a first input power value to the first voltage regulator based at least partially on the first output power value and (ii) a second input power value to the second voltage regulator based at least partially on the second output power value, wherein the determining includes referencing one of an input power table associated with an identified processor type and a power efficiency table; and transmit the first input power value and the second input power value from the board management controller to the third voltage regulator; and a VR controller configured to:

calculate an offset power value based on the first input power value and the second input power value;

calculate a total input power value based on the offset power value and a third input power value to a third voltage regulator; and transmit the total input power value to a processor of the electronic device, wherein the processor utilizes the total input power value to determine if the processor can support operation at higher frequencies, including at turbo states, or at higher processing speeds.

11. The power control system of claim 10, wherein the power management firmware further configures the board management controller to:

identify a processor type;

retrieve an input power table associated with the identified processor type;

complete the determining of the first input power value utilizing the first output power value and the input power table; and complete the determining of the second input power value utilizing the second output power value and the input power table.

12. The power control system of claim 10, wherein the power management firmware further configures the board management controller to:

trigger a processor stress test;

determine the first output power value and the second output power value during the processor stress test;

retrieve a power efficiency table;

complete the determining of the first input power value using the first output power value and the power efficiency table; and complete the determining of the second input power value using the second output power value and the power efficiency table.

13. The power control system of claim 10, wherein the power management firmware further configures the board management controller to:

determine the first output power value and the second output power value during operation of the processor;

retrieve a power efficiency table;

complete the determining of the first input power value using the first output power value and the power efficiency table; and complete the determining of the second input power value using the second output power value and the power efficiency table.

14. The power control system of claim 10, wherein the first input power value is associated with power delivered to a memory controller power terminal of the processor, the second input power value is associated with power delivered to a math coprocessor power terminal of the processor and the third input power value is associated with power delivered to a primary input power terminal of the processor.

15. A power control system comprising:

a power subsystem configured to be coupled to and supply power to a processor, the power subsystem including a first voltage regulator, a second voltage regulator, a third voltage regulator and a voltage regulator controller having power management firmware executing thereon that configures the voltage regulator controller to:

determine a first output power value from the first voltage regulator and a second output power value from the second voltage regulator;

retrieve a power efficiency table;

determine a first input power value to the first voltage regulator using the first output power value and the power efficiency table; and determine a second input power value to the second voltage regulator using the second output power value and the power efficiency table;

calculate an offset power value based on the first input power value and the second input power value;

calculate a total input power value based on the offset power value and a third input power value to a third voltage regulator; and transmit, by the VR controller, the total input power value to the processor, wherein the processor utilizes the total input power value to determine if the processor can support operation at higher frequencies, including at turbo states, or at higher processing speeds.

16. The power control system of claim 15, wherein the power management firmware further configures the voltage regulator controller to:

store the offset power value to an offset power register.

17. The power control system of claim 15, wherein the first input power value is associated with power delivered to a memory controller power terminal of the processor, the second input power value is associated with power delivered to a math coprocessor power terminal of the processor and the third input power value is associated with power delivered to a primary input power terminal of the processor.

18. An information handling system (IHS) comprising:

at least one processor;

a power subsystem communicatively coupled to the processor, the power subsystem supplying power to the at least one processor, the power subsystem including a first voltage regulator, a second voltage regulator, a third voltage regulator and a board management controller communicatively coupled to the first, second and third voltage regulators, the board management controller having power management firmware executing thereon that configures the board management controller to:

determine a first output power value from the first voltage regulator and a second output power value from the second voltage regulator;

determine both (i) a first input power value to the first voltage regulator based at least partially on the first output power value and (ii) a second input power value to the second voltage regulator based at least partially on the second output power value, wherein the determining includes referencing one of an input power table associated with an identified processor type and a power efficiency table;

transmit the first input power value and the second input power value from the board management controller to a VR controller of the third voltage regulator; and the power subsystem comprising the VR controller, which has additional power management firmware executing thereon that configures the VR controller to:

calculate, via the VR controller, an offset power value based on the first input power value and the second input power value;

calculate, by the VR controller, a total input power value based on the offset power value and a third input power value of the third voltage regulator; and transmitting, by the VR controller, the total input power value to a processor of the electronic device, wherein the processor utilizes the total input power value to determine if the processor can support operation at higher frequencies, including at turbo states, or at higher processing speeds.

19. The information handling system of claim 18, wherein the power management firmware further configures the board management controller to:

identify a processor type;

retrieve an input power table associated with the identified processor type;

complete the determining of the first input power value using the first output power value and the input power table; and complete the determining of the second input power value using the second output power value and the input power table.

20. The information handling system of claim 18, wherein the power management firmware further configures the board management controller to:

trigger a processor stress test;

determine the first output power value and the second output power value during the processor stress test;

retrieve a power efficiency table;

complete the determining of the first input power value using the first output power value and the power efficiency table; and complete the determining of the second input power value using the second output power value and the power efficiency table.

21. The information handling system of claim 18, wherein the power management firmware further configures the board management controller to:

determine the first output power value and the second output power value during operation of the processor;

retrieve a power efficiency table;

complete the determining of the first input power value using the first output power value and the power efficiency table; and complete the determining of the second input power value using the second output power value and the power efficiency table.

22. The information handling system of claim 18, wherein the first input power value is associated with power delivered to a memory controller power terminal of the processor, the second input power value is associated with power delivered to a math coprocessor power terminal of the processor and the third input power value is associated with power delivered to a primary input power terminal of the processor.

23. An information handling system (IHS) comprising:

at least one processor;

a power subsystem communicatively coupled to the processor, the power subsystem supplying power to the processor, the power subsystem including a first voltage regulator, a second voltage regulator, a third voltage regulator and a voltage regulator controller communicatively coupled to the first, second and third voltage regulators, the voltage regulator controller having power management firmware executing thereon that configures the voltage regulator (VR) controller to:

determine a first output power value from the first voltage regulator and a second output power value from the second voltage regulator;

retrieve a power efficiency table;

determine a first input power value to the first voltage regulator using the first output power value and the power efficiency table;

determine a second input power value to the second voltage regulator using the second output power value and the power efficiency table;

transmit the first input power value and the second input power value from a board management controller to the VR controller of the third voltage regulator;

calculate an offset power value based on the first input power value and the second input power value;

calculate a total input power value based on the offset power value and a third input power value of the third voltage regulator; and transmit the total input power value to a processor of the electronic device, wherein the processor utilizes the total input power value to determine if the processor can support operation at higher frequencies, including at turbo states, or at higher processing speeds.

24. The information handling system of claim 23, wherein the power management firmware further configures the voltage regulator controller to:

store the offset power value to an offset power register.

25. The information handling system of claim 23, wherein the first input power value is associated with power delivered to a memory controller power terminal of the processor, the second input power value is associated with power delivered to a math coprocessor power terminal of the processor and the third input power value is associated with power delivered to a primary input power terminal of the processor.

* * * * *